US008263028B1

(12) United States Patent
Vierheilig

(10) Patent No.: US 8,263,028 B1
(45) Date of Patent: *Sep. 11, 2012

(54) METHODS OF RECOVERING RARE EARTH ELEMENTS

(76) Inventor: Albert A. Vierheilig, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,023

(22) Filed: Oct. 10, 2011

Related U.S. Application Data

(62) Division of application No. 13/163,325, filed on Jun. 17, 2011.

(51) Int. Cl.
*C01G 17/00* (2006.01)
(52) U.S. Cl. ......... 423/21.1; 423/21.5; 423/263; 502/22
(58) Field of Classification Search ................. 423/21.1, 423/21.5, 263; 502/22, 24–29
See application file for complete search history.

(56) References Cited

U.S. PATENT DOCUMENTS

| | | | |
|---|---|---|---|
| 2,849,286 A * | 8/1958 | Welt et al. ............ | 423/8 |
| 2,900,231 A | 8/1959 | Kremers et al. | |
| 2,955,913 A | 10/1960 | Peppard et al. | |
| 3,615,170 A | 10/1971 | Hazen et al. | |
| 3,857,919 A | 12/1974 | Hazen et al. | |
| 3,943,051 A | 3/1976 | Ward | |
| 3,949,048 A | 4/1976 | Holt, Jr. | |
| 3,999,983 A | 12/1976 | Grosbois et al. | |
| 4,016,237 A | 4/1977 | Mason et al. | |
| 4,041,125 A | 8/1977 | Alstad et al. | |
| 4,069,040 A | 1/1978 | Thomas et al. | |
| 4,115,110 A | 9/1978 | Pyrih et al. | |
| 4,162,231 A | 7/1979 | Horwitz et al. | |
| 4,190,553 A | 2/1980 | Ward | |
| 4,255,394 A | 3/1981 | Helgorsky et al. | |
| 4,328,191 A | 5/1982 | Su et al. | |
| 4,330,429 A | 5/1982 | Sasaki et al. | |
| 4,461,748 A | 7/1984 | Sabot et al. | |
| 4,581,340 A | 4/1986 | Himpsl et al. | |
| 4,585,477 A | 4/1986 | Miöen | |
| 4,647,438 A | 3/1987 | Sabot et al. | |
| 4,670,228 A | 6/1987 | Braaten | |
| 4,726,938 A | 2/1988 | Rollat et al. | |
| 4,834,793 A | 5/1989 | Schneider et al. | |
| 4,888,207 A | 12/1989 | Flynn, Jr. et al. | |
| 4,927,609 A | 5/1990 | Leveque et al. | |
| 4,964,996 A | 10/1990 | Leveque et al. | |
| 4,964,997 A | 10/1990 | Leveque et al. | |
| 4,968,434 A | 11/1990 | Kaneko et al. | |
| 5,011,665 A | 4/1991 | Cailly et al. | |
| 5,030,424 A | 7/1991 | Fulford et al. | |
| 5,034,201 A | 7/1991 | Cailly et al. | |
| 5,047,139 A | 9/1991 | Gortsema et al. | |
| 5,147,527 A | 9/1992 | Hettinger | |
| 5,188,735 A | 2/1993 | Delloye et al. | |
| 5,192,443 A | 3/1993 | Delloye et al. | |
| 5,258,167 A | 11/1993 | Takahashi et al. | |
| 5,266,282 A | 11/1993 | Delloye et al. | |
| 5,336,450 A | 8/1994 | Ackerman et al. | |
| 5,338,520 A | 8/1994 | Leveque et al. | |
| 5,420,088 A * | 5/1995 | Silva et al. .......... | 502/22 |
| 5,437,709 A | 8/1995 | Ellis et al. | |
| 5,708,958 A | 1/1998 | Koma et al. | |
| 5,787,332 A | 7/1998 | Black et al. | |
| 5,858,061 A | 1/1999 | Kleinsorgen et al. | |
| 5,980,841 A * | 11/1999 | Yamamoto .......... | 423/21.1 |
| 6,455,018 B1 | 9/2002 | Cuif | |
| 6,626,979 B2 | 9/2003 | Marsden et al. | |
| 6,683,015 B2 | 1/2004 | Ofori et al. | |
| 6,893,482 B2 | 5/2005 | Marsden et al. | |
| 7,067,090 B2 | 6/2006 | Han et al. | |
| 7,125,436 B2 | 10/2006 | Marsden et al. | |
| 7,304,014 B2 | 12/2007 | Cavalcanti et al. | |
| 7,416,712 B2 | 8/2008 | Beckmann | |
| 7,517,384 B2 | 4/2009 | Marsden et al. | |
| 7,658,895 B2 | 2/2010 | Bhaduri | |
| 7,811,955 B2 | 10/2010 | Rigby et al. | |
| 7,837,960 B2 | 11/2010 | Bhaduri et al. | |
| 7,846,404 B2 | 12/2010 | Bhaduri et al. | |
| 2007/0039420 A1 | 2/2007 | Marsden et al. | |
| 2008/0015402 A1 | 1/2008 | Martens et al. | |
| 2009/0162267 A1 | 6/2009 | Otto et al. | |
| 2009/0272230 A1 | 11/2009 | Mackowski et al. | |
| 2010/0319491 A1 | 12/2010 | Sugahara et al. | |

OTHER PUBLICATIONS

Silva et al., "Catalyzed Electrochemical Dissolution for Spent Catalyst Recovery," Ind. Eng. Chem. Res., 32, pp. 2485-2489, 1993.
Villarreal et al., "Recovery of Vanadium and Molybdenum from Spent Petroleum Catalyst of PEMEX," Ind. Eng. Chem. Res., 38, pp. 4624-4628, 1999.
Soe et al., "Study on Extraction of Lanthanum Oxide from Monazite Concentrate," World Academy of Science, Engineering and Technology, 46, pp. 142-145, 2008.
Vuyyuru et al., "Recovery of Nickel from Spent Industrial Catalysts Using Chelating Agents," Ind. Eng. Chem. Res., 49, pp. 2014-2024, 2010.
Gerber et al., "Regeneration of Hydrotreating and FCC Catalysts," Prepared for the U.S. Department of Energy under Contract DE-AC06-76RLO 1830, Pacific Northwest National Laboratory, Richland, WA/University of Idaho, Moscow, Idaho, Sep. 1999.
Grace Davison—Guide to Fluid Catalytic Cracking—Part Two, W.R. Grace & Co., Conn., 1996.
Hernandez-Beltran et al., "Dealumination-aging pattern of REUSY zeolites contained in fluid cracking catalysts," Applied Catalysis A: General 240 (2003) pp. 41-51.
Mario L. Occelli, Editor, "Fluid Catalytic Cracking II," ACS Symposium Serious 452, sponsored by the Division of Petroleum Chemistry, Inc. at the American Chemical Society, Washington, DC, Aug. 26-31, 1990.
"Acid Recovery with Diffusion Dialysis," Pure Cycle—Acid Recycling Systems, http://www.purecycle.com/metals.html, retrieved May 26, 2011, pp. 1-3.
Pure Cycle Environmental LLC, Model A-15 Acid Recycling System, pp. 1-2, retrieved from www.purecycle.com Jun. 2011.

* cited by examiner

*Primary Examiner* — Steven Bos
(74) *Attorney, Agent, or Firm* — Greer, Burns & Crain, Ltd.

(57) ABSTRACT

Processes described include reacting a fresh or spent catalyst, or sorbent, with a solution containing an extracting agent (such as an acid or a base). Preferably, the catalyst contains both alumina and a molecular sieve (or a sorbent), and the reaction is performed under relatively mild conditions such that the majority of the base material does not dissolve into the solution. Thus, the catalyst can be re-used, and in certain instances the catalyst performance even improves, with or without re-incorporating certain of the metals back into the catalyst. Additionally, metals contained in the catalyst, such as Na, Mg, Al, P, S, Cl, K, Ca, V, Fe, Ni, Cu, Zn, Sr, Zn Sb, Ba, La, Ce, Pr, Nd, Pb, or their equivalent oxides, can be removed from the catalyst. Some of the metals that are removed are relatively valuable (such as the rare earth elements of La, Ce, Pr and Nd).

42 Claims, 2 Drawing Sheets

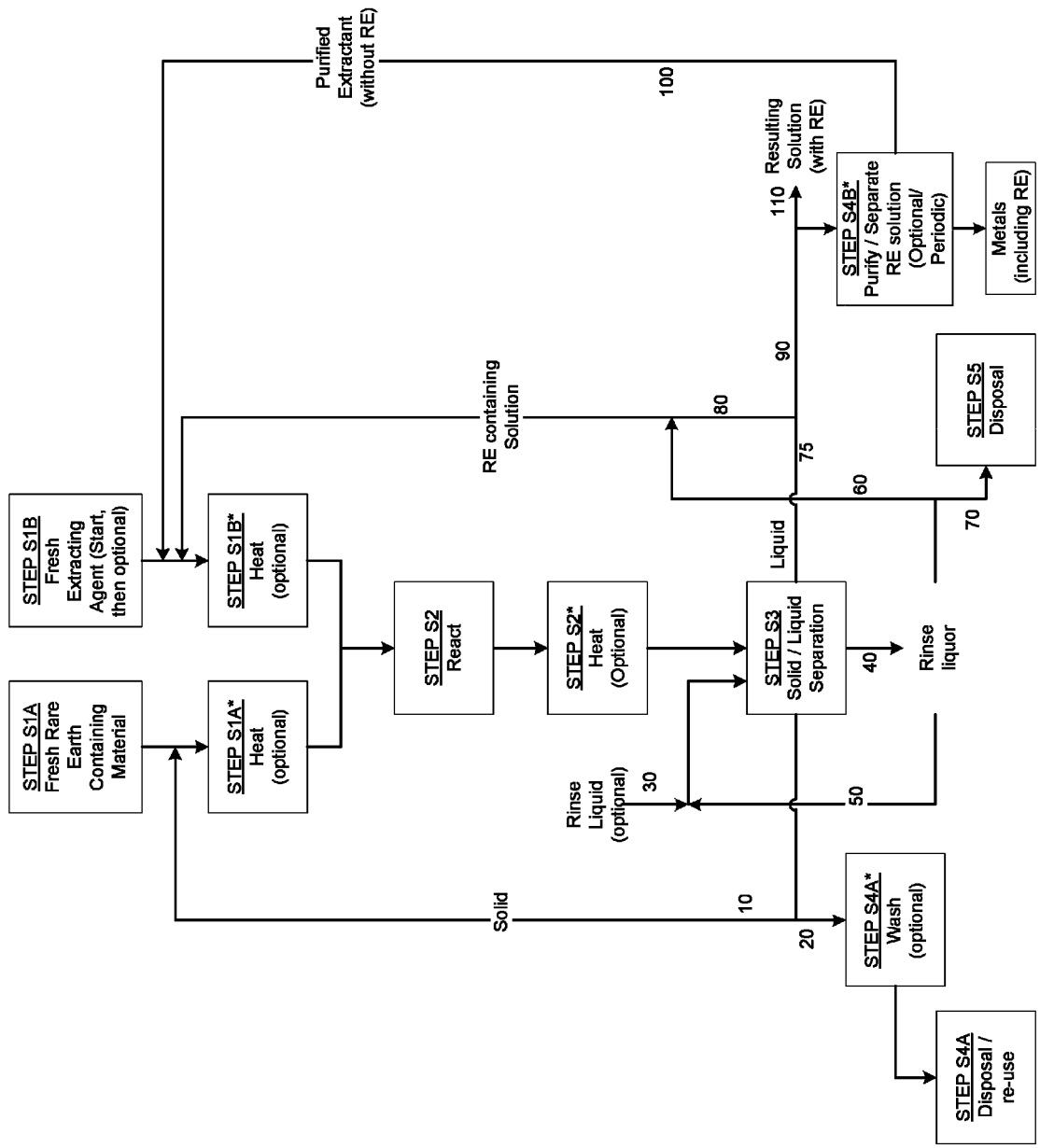

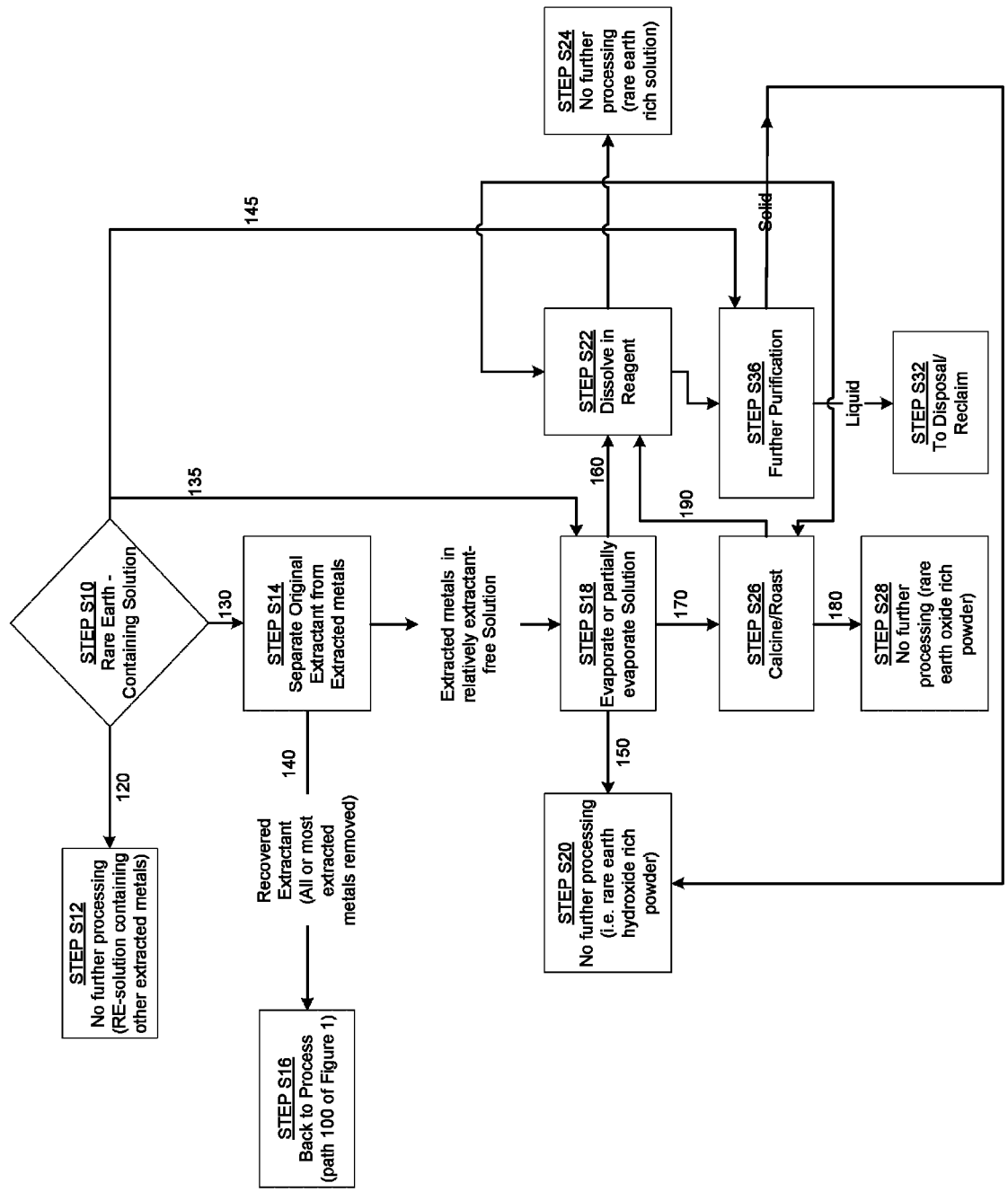

METHODS OF RECOVERING RARE EARTH ELEMENTS

This application is a divisional of application Ser. No. 13/163,325, filed Jun. 17, 2011.

The present invention relates generally to methods of recovering rare earth elements from a rare earth containing material and/or to methods of producing a solution containing one or more rare earth elements that have been extracted from rare earth containing material. More particularly, the present invention relates to the application of such methods to molecular sieve containing materials, such as catalysts, as well as to sorbents and sorbent containing materials.

BACKGROUND OF THE INVENTION

There exist various industrial processes that utilize substantial quantities of catalysts and/or sorbents in order to manufacture different products. For example, one of the largest consumers of catalysts and sorbents is the oil refining industry, which utilizes catalysts/sorbents in different processes, such as the fluid catalytic cracking (FCC) process, the hydrotreating process, the hydrocracking process, and the process of the sorption of sulfur oxides from flue gas, among others. Other industrial processes utilizing catalysts and/or sorbents in other industries include the fertilizer industry, the chemicals sector, and the automotive industry (such as in catalytic converters).

Within these industrial processes that use catalyst and/or sorbent materials, many are based upon utilizing aluminum-containing compounds as part of the catalyst/sorbent. Additionally, many also contain aluminum or non-aluminum containing molecular sieve materials as part of the catalyst/sorbent. For example, in the FCC process and in the hydrocracking process, the molecular sieve is a zeolite. More specifically, it is a zeolite of the Y-type or the faujasite-type.

Some industrial processes utilize catalyst/sorbents on a periodic basis, meaning that catalyst/sorbent material is loaded into vessels/columns and is run with little or no change over long periods of time. In other processes, fresh catalyst/sorbent material is periodically or continuously added in order to account for reductions in performance and/or activity due to physical losses, or deactivation due to factors such as steam, temperature, time and contaminant metals contained in the feedstock. One example of such a process requiring replacement or replenishment of the catalyst/sorbent material is the FCC process.

To the extent additions of fresh catalyst exceed the physical losses of the processing unit, there is a need for further withdrawal of spent catalyst from the unit. Such spent catalyst can no longer function properly in the process due to the deposition of sulfur, carbon, vanadium and/or other elements which inhibit or diminish the catalytic activity. This type of material is often referred to as either spent catalyst, equilibrium catalyst, or simply as "ECAT." Typical withdrawals from the FCC process range from a few tons per day, to as much as thirty, or more, tons per day. The methods of disposing of this spent material vary depending on the quality of the material. For instance, material which is low in contaminant metals, and most likely high in remnant activity, is often resold and incorporated in full, or more typically, as a supplement to the new, or fresh, catalyst being added to another FCC unit. The spent catalyst may also be used during unit upset conditions, start-up of the process following a shutdown due to new unit installation, maintenance, or other planned or unplanned shutdowns. Spent catalyst that is not capable of suitable performance in another refinery is often disposed of in landfills, or by incorporating it into other industrial processes/products such as by incorporating it into cement and road pavement. Alternatively, the spent catalyst may have other catalytic uses in other processes that require a particular property of the spent material, such as surface area/sites, or heavy molecule processing capability.

At present, most catalyst is not considered to be hazardous waste, so the presence of the various metals contained in the catalyst are not a hindrance to normal disposal in landfills. It is possible that in the future, government entities in various countries around the world may impose regulations that would limit the disposal options, and/or that would add a significant economic cost to the disposal operation.

Instead of simple disposal of the entire spent catalyst in landfills, some catalysts that contain expensive or hazardous components can have those components recovered prior to disposal. Often, the entire catalyst is dissolved in order to recover the metals, and then the final solid residue is made environmentally safe for disposal prior to such disposal. One example of this type of material is a hydrotreating catalyst, which often contains metals such as Cr and Mo. Other type of catalysts subject to recovery may contain large amounts of precious metals (i.e., platinum, palladium, etc.), which are valuable.

Improvement of the performance of spent catalyst has also been of great interest. The goal is typically to either separate high performing catalyst from low activity catalyst, or to improve the activity of the bulk catalyst. This has been known to be performed using either magnetic separation or chemical treatment processing of the spent catalyst. However such processes are not routinely utilized upon the bulk of spent catalyst. The main reason is believed to be that the performance improvement per unit cost has not been high enough, when compared to simply purchasing new catalyst.

There remains a need to find new processes which are capable of economically increasing the performance of spent catalyst, and/or in recovering metals contained in the catalyst prior to disposal, especially in recovering rare earth materials, which are becoming increasingly expensive. Some of the objectives of the present invention are to address these needs, among others, with novel compositions and processes, which processes can also be applied to sorbents.

BRIEF SUMMARY OF THE INVENTION

The present inventor has unexpectedly discovered that by reacting a fresh or spent catalyst, or sorbent, with a solution containing an extracting agent (such as an acid or a base), where the catalyst contains both alumina and a molecular sieve (and/or a sorbent), and where the reaction is performed under mild conditions of treatment such that the majority of the base material does not dissolve into the solution, that the performance of the catalyst improves. Additionally, metals contained in the catalyst, such as Na, Mg, Al, P, S, Cl, K, Ca, V, Fe, Ni, Cu, Zn, Sr, Zn Sb, Ba, La, Ce, Pr, Nd, Pb, their equivalent oxides, or reaction products of elements or their oxides, can be removed from the catalyst. Some of the metals that are removed have economic significance for re-use (such as the rare earth elements of La, Ce, Pr and Nd), while others have negative environmental impact and thus their removal for recycling or separate disposal is preferred. Additionally, the present Applicant has discovered that re-incorporating certain of the metals back into the improved catalyst also provides improved performance benefits.

The performance benefits include, for example, increases in the crystallinity of the contained molecular sieve and increases in the surface area of the catalyst. These improvements are almost always found to occur with some loss in aluminum content of the catalyst. Higher aluminum loss of the catalyst during the processing has been found to lead to some difficulty in separating the solid product from the liquid product which contains the dissolved metals. It is therefore one of the features of some embodiments of the present invention that when utilizing relatively mild conditions (time, temperature, pressure, acid/base concentration, acid/base selection), a relatively large amount of the desired materials (such as rare earth elements and/or their equivalent oxides) can be removed from the composition, while a relatively small, or even negligible, amount of aluminum is removed from the composition. Additionally, it has been found that even in conditions of moderate severity, an increase in the performance properties results, as indicated by increases in zeolite crystallinity/content and surface area. This resulting material can be re-used in various industrial processes with improved performance benefits. Alternatively, material which has been reduced in particle size to an extent where it is not conducive to reuse in its current state may be reincorporated into a new physical shape/form by adding binders/fillers and forming it into a shaped particle, extrudate, or pellet.

More specifically, embodiments of the present invention provide a method of producing a resulting solution including at least one rare earth element. The method includes the steps of:

providing a first sample of a rare earth containing material having the at least one rare earth element therein;

reacting the first sample of the rare earth containing material with an extracting agent to extract at least a portion of the at least one rare earth element from the first sample of the rare earth containing material;

separating the reacted first sample, which has lost at least some of the at least one rare earth element previously associated therewith, from the extracting agent;

repeating the reacting step for multiple iterations, designated as (n) iterations where (n) is a whole number, with an extracting agent that already includes at least some of the rare earth element, but while using a sample of a rare earth containing material that differs from the first sample of the rare earth containing material, for at least some of said multiple iterations of said reacting step, to further enrich the amount of the at least one rare earth element in the resulting solution;

repeating the separating step for (n) iterations; and obtaining the resulting solution, which includes the at least one rare earth element extracted from the rare earth containing material during the multiple iterations of said reacting step.

In addition, embodiments of the present invention provide a method of recovering one or more rare earth elements from a rare earth containing material. The method includes the steps of:

providing the rare earth containing material having aluminum and at least one rare earth element therein, wherein the weight percentage of the aluminum, as its oxide equivalent, is defined as $A_O$% and the weight percentage of the at least one rare earth element, as its oxide equivalent, is defined as $R_O$%; and reacting the rare earth containing material with a solution to extract a relatively large proportion of at least a portion of the at least one rare earth element from the rare earth containing material, while extracting only a relatively moderate proportion of the aluminum, such that the resulting weight percentage of the at least one rare earth element, as its oxide equivalent, remaining in the rare earth containing material, defined as $R_F$%, and the resulting weight percentage of aluminum, as its oxide equivalent, remaining in the rare earth containing material, defined as $A_F$%, satisfy the following relationships:

$R_F$% is less than or equal to approximately 0.4 $R_O$%; and
$A_F$% is greater than or equal to approximately 0.5 $A_O$%.

Further, embodiments of the present invention provide a method of recovering one or more rare earth elements from a rare earth containing material. The method includes the steps of:

providing the rare earth containing material, of a weight $W_{RE}$, having aluminum and at least one rare earth element therein, wherein the weight percentage of the aluminum, represented as its weight percent oxide equivalent $Al_2O_3$, is defined as $A_O$% and the weight percentage of the at least one rare earth element, represented as its weight percent oxide equivalent, is defined as $R_O$%; and reacting the rare earth containing material with a solution, of a volume $V_S$, to extract a relatively large proportion of at least a portion of the at least one rare earth element from the rare earth containing material, while extracting only a relatively moderate proportion of the aluminum, such that the resulting weight percentage of the at least one rare earth element, as its oxide equivalent, remaining in the rare earth containing material, defined as $R_F$%, and the resulting weight percentage of aluminum, as its oxide equivalent, remaining in the rare earth containing material, defined as $A_F$%, satisfy the following relationships:

$$x = \frac{R_o}{A_o} \times \frac{A_f - A_o}{R_f - R_o}$$

where x is less than or equal to about 0.8; and
$y = W_{RE}$ (in grams)/$V_S$ (in milliliters),
where y is greater than or equal to about 0.025.

BRIEF DESCRIPTION OF THE SEVERAL VIEWS OF THE DRAWINGS

Preferred embodiments of the present invention are described herein with reference to the drawings wherein:

FIG. 1 is a flowchart of an example of an embodiment of the present method of recovering rare earth elements from a catalyst; and FIG. 2 is a flowchart of potential processing steps for the rare earth containing solution that results from path 110 of the flowchart of FIG. 1

DETAILED DESCRIPTION OF THE INVENTION

One aspect of the present invention relates to methods of recovering one or more rare earth elements (such as lanthanum (La), cerium (Ce), praseodymium (Pr), neodymium (Nd), etc.) from a rare earth containing material. Turning now to FIGS. 1 and 2, an explanation of the steps involved in examples of some embodiments will be described. Following the description of FIGS. 1 and 2, an explanation of some specific examples will be provided.

Step S1A of FIG. 1 involves providing a sample of the rare earth containing material (i.e., a material including at least one rare earth element therein, such as lanthanum, cerium, praseodymium, neodymium, and/or alloys thereof), which can be in any desired form, where preferred forms include powders or extrudates. Further, the rare earth containing material ("RE containing material") provided in Step S1A also preferably includes aluminum. For example, in certain embodiments, the RE containing material is a molecular sieve, a material that includes a molecular sieve (both of which will referred to as a "molecular sieve containing material"), a sorbent, or a sorbent containing material (both of which will referred to as a "sorbent containing material") and that includes at least one element selected from the following: silicon, phosphorus and aluminum. Preferably, the RE containing material is also a zeolite containing material (wherein a zeolite is one particular type of molecular sieve), one example of such a material is a fluid catalytic cracking (FCC) catalyst. If an FCC catalyst is used, it can be either a fresh catalyst (i.e., unused in a FCC process) or a spent catalyst (i.e., previously used in a FCC process). Similarly, if another type of catalyst is used, it could also be fresh or spent. Prior to Step S1A, the spent catalyst, if being used, may be washed, de-oiled, or calcined/roasted if necessary, by any methods known to those of ordinary skill in the art.

Step S1B involves providing an extracting agent, which is a material that can extract at least some of the rare earth element from the RE containing material. It is contemplated that the extracting agent can be in any form (liquid solid, gas). In certain embodiments, the extracting agent is an acidic or basic solution. Preferably, when using such an acidic or basic solution, the extracting agent is a liquid solution having a pH of either less than approximately 6 or greater than approximately 8. More preferably, such a liquid solution will have a pH of either less than approximately 3 or greater than approximately 10.

For example, the extracting agent could be a solution of water and one or more of the following: (a) nitric acid; (b) hydrochloric acid; (c) maleic acid; (d) formic acid; (e) sulfuric acid; (f) acetic acid; (g) ammonium citrate; (h) ammonium hydroxide; (i) ammonium chloride; (j) ammonium sulfate, (k) ethylenediamine, etc. Of course, the acids and bases listed herein are examples only, and other acids or bases are also contemplated as being within the scope of the invention.

Steps S1A* and S1B* of FIG. 1 are optional steps showing that the RE containing material and/or the extracting agent can be heated before proceeding to Step S2, which is a step of reacting the RE containing material with the extracting agent. Such heat of Steps S1A* and S1B* can be applied in any desired manner, such as by placing the material intended to be heated into an oven, or other heat producing device, or by directly heating the vessel within which the material is contained, such as by applying a flame to the exterior of the vessel. The choice of whether to apply heat to the RE containing material, the extracting agent, to neither, or to both depends on a variety of circumstances. For example, applying heat to either the RE containing material or the extracting agent, or both, can, with certain combinations of RE containing materials and extracting agents, reduce the required reacting time of Step S2. On the other hand, with certain extracting agents, such as sulfuric acid or hydrochloric acid, heat is not necessary and the reaction proceeds relatively quickly even in the absence of the application of heat.

Turning now to Step S2, this step is the step of reacting the RE containing material with the extracting agent. During this step, the first sample of the RE containing material (of Step S1A) is reacted with the extracting agent (of Step S1B) to extract at least a portion of the at least one rare earth element from the first sample of the RE containing material.

The reacting step (Step S2) may be accomplished in any of a variety of different ways, depending upon a number of different factors, such as the specific material and the specific agent being reacted, the desired material being extracted, the desired time available for the process, the scale of the process (i.e., the weights/volumes of the material being reacted), the particular conditions or states of the materials, etc. Examples of the types of equipment that can be utilized in the reacting step include mix tanks and in-line mixers. Thus, such reacting step can be performed using either a batch process or in a continuous mode.

In certain embodiments, the extracting agent is a liquid solution (such as an acidic or basic solution) and the RE containing material is a solid in the form of a power, an extrudate, pellets, or microspheres. In such situations, the extracting agent and the RE containing material can be mixed together in any appropriate vessel (with agitation, such as stirring, if desired). Alternately, in such embodiments, the RE containing material can be placed within an appropriate vessel, and the extracting agent can merely be passed over the RE containing material. Such a process may be accomplished, for example, by using a vessel that has a screen, or similar filter, as its bottom interior surface, and by simply pouring the liquid solution over the RE containing material, whereby after the solution contacts the RE containing material, the liquid solution (including the extracted RE material) passes through the screen, while the RE containing material (which now includes less rare earth (RE) material than before such contact due to the extraction) remains on the screen within the vessel.

In other embodiments, it is contemplated that the extracting agent could be a solid or a gas. In either case (as well as with a liquid extracting agent), contact with the extracting agent must be of the type and sufficiency such that at least a portion of the RE is extracted from the RE containing material.

As represented by Step S2*, which is another optional step, heat may be optionally applied to the combination of the RE containing material and the extracting agent, which may be in the form of a slurry, during the reacting step, for the same purposes and by the same methods described above. For example, heat can be applied such that the liquid solution reaches a maximum temperature between the range of at least approximately 45° C. and approximately 130° C. Thus, heat can be applied during any one, or more, of the following steps, Step S1A*, Step S1B* and/or Step S2* (where the * represents that the step is optional).

Next, the process continues to Step S3, which is a step of separating the reacted first sample (which has lost at least some of the at least one rare earth element previously associated therewith) from the extracting agent. For this step, any known separation method may be used. In certain embodiments, during this step, the remains of the first sample of the RE containing material after the reacting step (Step S2) will be in the form of a solid, and the extracting agent (which will include the extracted rare earth element(s) in solution) will be in the form of a liquid. Thus, for such embodiments, the materials are transferred to a liquid-solid separator within which any known solid/liquid separation technique may be used.

For example, the solids may be separated from the liquid by filtration (such as with a vertical type centrifugal filter, a vacuum filter, a plate and frame filter, etc.), using decantation, centrifugation, settling, etc., or any other methods, or combinations of methods, known to those of ordinary skill in the art. Optionally, a rinsing liquid, such as water, a liquid containing an acid or base, or combinations thereof may be applied to the solids after separation, as represented by path 30. Such rinsing liquid can be used to remove the extracting agent that has adhered, or otherwise remains, on the separated solids and/or to neutralize the separated solids prior to disposal or use in further process steps. After the rinsing liquid passes through the liquid-solid separator (path 40), the rinse liquor may be re-cycled back into the liquid solid separator along path 50 to rinse the next batch of separated solids (or to further rinse the present batch), either with or without the addition of fresh rinse liquid (path 30). As a second alternative, the rinse liquor may be directed to enter the liquid side of the process along path 60, in which case the rinse liquor is combined with the liquid solution that was separated during Step S3. Or, as a third alternative, the rinse liquor may be directed along path 70 for disposal (Step S5) in any known manner In embodiments in which the rare earth element was located upon a molecular sieve containing material, such as a catalyst, the solids will consist of the molecular sieve containing material and any other solid materials that have been extracted, but that are not in solution with the liquid solution; and the liquid will consist of the liquid acidic or the liquid basic solution with the rare earth material as part of the solution, if such liquid solution was used as the extracting agent. For example, in an embodiment in which the RE containing material is an ECAT, the solids will consist of the molecular sieve catalyst, which will still include the bulk of the primary materials attached to the molecular sieve (such as the aluminum and the silicon) and the liquid will consist of the acidic or basic solution (depending on the type of extracting agent used) with the rare earth materials (such as lanthanum (La), cerium (Ce), praseodymium (Pr) and neodymium (Nd)) extracted during the reacting step (Step S3) in solution with the liquid (such as a solution that includes La $(NO_3)_3$ and $(H_2O)$).

In embodiments in which Step S3 is a solid/liquid separating step, the solids that have been separated from the liquid (by any one or more of the methods mentioned above, such as filtration, decanting, through the use of a centrifuge, etc.) may take either of two paths, designated as paths 10 and 20. As explained more fully below, path 10 is a path in which the solids are run through the procedure again, starting prior to the optional heating step (Step S1A*), either with or without the optional heating step (Step S1A*), and path 20 is a path in which the solids are removed from the system for either disposal or for re-use (with any optional further treatments required for such re-use, as necessary). It is also contemplated that part of the solids could go along path 10 and that part could go along path 20. Further, it should be noted that paths 10 and 20 may not contain all of the solids, because the liquid of paths 40 and 75 may also include some solids that can be separated out by further processes.

More specifically, starting with the path 10, the solids, which, for example, may be an FCC catalyst that has had at least some of the rare earth elements removed therefrom by the Step S2, may be run through the process again, starting at either the optional heating step (Step S1A*) or at the reacting step (Step S2), if one desires to attempt to extract additional material, such as one or more additional rare earth elements, from the catalyst. If desired, the solids may be run through the process (i.e., the procedure may include path 10) for any number of iterations. Further, it is also contemplated that the solids of path 10 could be stored for use in future processes of the type demonstrated by FIG. 1, or that they could be used in a separate process of the type demonstrated by FIG. 1 that is being run in parallel with the present process.

In certain embodiments, at least some of the samples of the RE containing material used during the multiple iterations of the reacting step (Step S2) include the same rare earth element as the first sample of the RE containing material. For example, if two or more rare earth materials are being focused on, such as lanthanum and cerium, at least some of the sample of the RE containing material should include lanthanum and at least some should contain cerium, but all samples need not contain both lanthanum and cerium. However, it is preferably if all of the samples of the RE containing material used during the multiple iterations of the reacting step include the same rare earth element as the first sample of the RE containing material in order to increase the yield of that rare earth material. Further, it is also preferably that at least some, and more preferable that most or all, of the samples of RE containing material used during the multiple iterations of the reacting step have essentially the same chemical composition as the chemical composition of the first sample of the RE containing material, which improves the efficiency of the process.

Turning back to FIG. 1, if path 20 is followed instead of path 10, the solids may optionally be washed in optional Step S4A*, prior to moving to Step S4A, where the solids are disposed of in any desired manner known to those of ordinary skill in the art (such as in a landfill or as an added component to roadway material) or re-used (in a process requiring a catalyst, such as in an FCC process). If the optional washing step (Step S4A*) is selected, the solids may be washed with any appropriate liquid, such as water, an acidic solution or a basic solution.

If necessary and desired, the solids of Step S4A may be the subject of further treatment to reactivate them, such as, for example, by undergoing a process in which materials are added back into the solids so that they can be re-used for their originally intended purpose, such as an FCC catalyst. Alternately, it is also contemplated that the solids of Step S4A could be used for a purpose different from the one that they were originally designed for.

In certain embodiments, the resulting solids that have undergone the process of FIG. 1 could actually perform their designated catalytic functions better than even the original, un-treated catalyst, either with or without adding the rare earth materials to the molecular sieve. Example of such situations will be explained in more detail below when discussing Table 2, after discussing some specific examples of embodiments of the process in Tables 1A-1C.

Turning again to FIG. 1, although both paths 10 and 20 have been shown in the flowchart of this figure, Applicant believes that in most situations, path 10 will not be taken very frequently due to the relatively high efficiency of the step in which the rare earth compounds are removed from the solids, and thus the solids will not normally be re-introduced into the system. Instead, path 20, in which the solids are removed for re-use or disposal, will be the more frequently chosen option.

Returning to Step S3 of FIG. 1, as the path of the solids has already been described (along one of path 10 or path 20), the path of the liquid separated by the liquid-solid separator, if such a device is used, will be described next. The liquid separated by the liquid-solid separator in Step S3 travels along path 75, where it is further directed along either path 80 or along path 90 (or with some liquid directed along each path). If it is directed along path 80, the liquid is run through the procedure again, starting with the heating step (Step S1B*), which is optional, and continuing with the reacting step (Step S2), etc. The liquid travelling along path 80, which will include the rare earth element extracted from the RE-containing material during the reacting step (Step S2), can thus be further enriched with an additional amount of the rare earth element by being run through the process again, especially if the reacting step is performed with a new sample of the RE containing material (such as with a new sample of ECAT) in Step S1A.

In other words, the reacting step (Step S2) may be repeated for multiple iterations, which can be designated as (n) iterations (where (n) is a whole number) with an extracting agent that already includes at least some of the rare earth element, but while using a sample of a rare earth containing material that differs from the first sample of the rare earth containing material, for at least some of the multiple iterations of the reacting step (Step S2). Such repeated iterations further enrich the amount of the at least one rare earth element in the resulting solution. It is contemplated that the multiple iterations could include iterations in which fresh extracting agent are combined with iterations in which extracting agent from the process of FIG. 1 (i.e., the path 80 solution) in any desired manner (such as a simple alternating pattern, a pattern in which multiple iterations of path 80 solution are run for every one iteration of fresh extracting agent, a pattern in which multiple iterations of fresh extracting agent are run for every one iteration of the path 80 solution, an irregular sequence, etc.).

Preferably, during each successive iteration of the reacting step (step S2), the amount of the rare earth element in the extracting agent used during a particular iteration of the reacting step is greater than or approximately equal to the amount of rare earth element in the extracting agent of the immediately preceding iteration of the reacting step. Thus, the extracting agent is preferably further enriched with more and more rare earth material in each iteration of the process.

Another preference is that that during each successive iteration of the reacting step, the amount of the rare earth element in the RE containing material (such as a molecular sieve containing material) used during a particular iteration of the reacting step is greater than or approximately equal to the amount of rare earth element in the molecular sieve containing material of the immediately preceding iteration of the reacting step. In other words, it is preferred that different samples of RE containing material are introduced in Step S1A for each iteration (regardless of whether materials such as spent catalyst or fresh catalyst are used), instead of using the process along path 10 of FIG. 1, which re-uses the same RE containing material in further iterations. This is the case because the re-used RE material is has already had some of rare earth materials extracted, and thus further extraction is more difficult.

In some embodiments, the process may be repeated for only a few iterations (where n equals between 2 and 10 iterations), or it may be repeated for a large amount of iterations (in the hundreds range, such as n equals at least 200 or at least 300, or more), or it may be repeated for a moderate number of iterations, which would be a range between the few iterations and the large amount of iterations mentioned previously.

As with the solids of path 10, it is also contemplated that the liquid of path 80 could be stored for use in future processes of the type demonstrated by FIG. 1, or that it could be used in a separate process of the type demonstrated by FIG. 1 that is being run in parallel with the present process.

As an alternative to having the liquid that was separated by the liquid-solid separator in Step S3 travel along path 80 (for another iteration in the process), it could instead travel along path 90 to Step 54B*, which is an optional step (like all steps marked with the symbol *) in which the liquid solution is purified for reuse in another iteration of the process (path 100) and the reject and rare earth materials are separated from the solution, and which reject and rare earth materials can be sold, used in a different process, or disposed of if they are of little value. Thus, the solution of path 100 differs from the solution of path 80 because the solution of path 100 has been purified, and the metals, such as lead, nickel, iron and the rare earth materials have been at least partially removed from the solution, while the solution of path 80 has not been purified, and thus includes the reject materials, as well as the rare earth materials.

The optional purification/separation step (Step S4B*) may be performed by any known process. For example, the optional purification/separation step my be performed by any known acid recovery process, such as a process known as diffusion dialysis, which works by transferring the used acid through an anion exchange membrane against a counter-flowing water stream. Briefly, in this process, as known in the art, the acid solution (solute) is on one side of the membrane, and the de-ionized water (solvent) is on the other side, moving in the opposite direction within a single container. The acid passes, or diffuses, through the membrane and into the water, resulting in the reclaimed acid exiting the container from the water side. However, the reject metals and rare earth materials, along with a low percentage (normally approximately 15%) of acid that is associated with the metals, cannot pass through the membrane, and therefore exit the container from the acid side. Devices for accomplishing such processes are available from a variety of sources, such as from: Pure Cycle Environmental LLC. Of North haven Conn. (www.purecycle.com). Presumably, the optional purification/separation step (Step S4B*) could be performed with materials other than acids, such as with a base.

If the optional purification/step (Step S4B*) is not performed, the process can run along path 110 and be terminated (after the desired number of iterations along path 80), and the resulting solution (which includes the RE materials that have been extracted) can be used for any desired purpose. For example, it can be sold as is, or it can be further processed to remove the valuable RE materials from the solution by any known method, such as with selective precipitation, which is a process known to those of ordinary skill in the art.

Briefly, with such a process of selective precipitation, a base is slowly added to the resulting solution to increase the pH of the solution to a desired narrow range, at which point certain materials begin to precipitate out of the solution, and can thus be removed by filtration or other solid/liquid separation techniques. Then, the base is again slowly added to increase the pH of the solution to another desired narrow range (higher than the first range), at which point certain other materials begin to precipitate out of the solution, and can thus be removed by filtration or other solid/liquid separation techniques. The process is continued until all of the desired rare earth materials have been removed from the solution. In the alternative, other known methods, such as solvent extraction, could also be used to remove the valuable rare earth materials from the resulting solution, if desired.

In order to help visualize some of the previously-discussed options available for the resulting rare earth containing solution of termination path 110 of FIG. 1, the chart of FIG. 2 has been provided. Starting with Step S10, which is initial step (i.e., where the rare earth (RE) containing solution from path 110 of FIG. 1 is provided), the process can continue along any of the following paths:

(i) along path 120 to Step S12, in which no further processing takes place and the RE containing solution is used for a different process, sold to a third party, etc;

(ii) along path 130 to Step S14, which is a step of separating the original extractant (extracting agent) from the extracted metals, as described below;

(iii) along path 135 to Step S18, which is which is a step of evaporating, or partially evaporating, the solution, as described below; or (iv) along path 145 to Step S30, which is a purification step, as described below.

Details of example processes for Steps S14, S18, and S30, and other related steps, will be described next.

Step S14 could be any desired acid (or base) recovery process, such as the diffusion dialysis process discussed above, that could be used for separating the original extractant (extracting agent) from the extracted metals. After completing Step S14, the recovered extractant (extracting agent) from which all, or at least most, of the reject metals (such as lead nickel, and iron) and the RE material have been removed, moves along path 140 to Step S16, which returns the extractant (extracting agent) to the process of FIG. 1 (along path 100 of FIG. 1).

The extracted metals (such as lead, nickel, and iron and the RE materials) from Step S14, which are found in a solution that is relatively extractant free, can be recovered by any known method from the remaining solution by proceeding to Step S18, which is a step of evaporating, or partially evaporating, the solution. The result of Step S18 can proceed along one of the following three paths: path 150, path 160 or path 170, as described below.

If path 150 is selected, there is no further processing (see terminal Step S20), and the result is, for example, a powder that is rich in rare earth hydroxides. Since the rare earth materials are valuable, such powder could be sold, and the rare earth materials could be recycled into new catalysts, or into any other type of product that utilizes such materials.

If path 160 is selected, the resulting solids after evaporation could be dissolved in a reagent (which, in preferred embodiments, could be acidic or basic) in Step S22, which results in a rare earth rich solution (see terminal Step S24), which can be sold to any third party user of such a solution, or used for any desired purposes. In certain embodiments, the solution of terminal Step S24 will have an acidic or basic concentration of between approximately 0.1 molar and approximately 25 molar.

Preferably, the resulting solution of Step S24, will include at least 20%, on an oxide basis, of the at least one rare earth element that was extracted from the rare earth containing material, after performing the reacting step (Step S2 of FIG. 1) multiple times. And even more preferably, the resulting solution, after performing the reacting step multiple times, will includes at least 30% on an oxide basis, of the at least one rare earth element that was extracted from the rare earth containing material.

If path 170 is selected, the calcine/roast process of Step S26 can be performed by heating the solution or residue to elevated temperatures, and the resulting product can either be passed along path 180 to terminal Step S28, which involves no further processing and results in a powder that is rich in rare earth oxides, or the resulting product can go along path 190 to Steps S22 and Step S24, as described above. The combination of process Step S18, path 170, process Step S26, path 190 and process Step S22 can be used (instead of merely going from process Step S18, path 160 to process Step S22 (i.e. omitting Step S26)) to facilitate the dissolving process of Step S22.

As an alternative to proceeding from Step S22 (the dissolving in reagent step) to terminal Step S24, the process may instead pass from Step S22 to Step S30 for further purification, such as by using the selective precipitation process described above. The resulting solids from Step S30 will, in preferred embodiments, require no further processing, as indicated by Step S20, which shows that in certain embodiments, these solids will be in the form of a powder that is rich in rare earth hydroxides. The resulting liquid from Step S30 can be either disposed of or reclaimed, if desired, as indicated by Step S32.

Next, various specific examples of the embodiments of the process will be described in detail, while referring to Tables 1A-1C. Of course, these examples are for the purpose of explanation only, and should not be considered as limiting the scope of the invention.

TABLE 1A

| Example No | Acid/Base | Reagent/Conditions | Reagent Concentration | Catalyst | Catalyst Qty, gr | Reagent Qty, ml | gr Cat/ml Reagent | Tmax (C) | Time (hrs) |
|---|---|---|---|---|---|---|---|---|---|
| 1, RE-A | — | — | — | ECAT A | — | — | | — | — |
| 2 | Acid | Nitric Acid | 16M | ECAT A | 14 | 200 | 0.07 | 80 | 3.5 |
| 3 | Base | Ammonium Citrate | 1M | ECAT A | 25 | 100 | 0.25 | 78 | 1.75 |
| 4 | Acid | Nitric Acid | 16M | ECAT A | 25 | 100 | 0.25 | 46 | 2.25 |
| 5 | Acid | Nitric Acid | 16M | ECAT A | 100 | 100 | 1.00 | 76 | 1.5 |
| 6 | Acid | Sulfuric Acid | 96% | ECAT A | 25 | 100 | 0.25 | 90 | 2 |
| 7 | Acid | Hydrochloric Acid | 12M | ECAT A | 25 | 100 | 0.25 | 90 | 2 |
| 8 | Acid | Acetic Acid | 84% | ECAT A | 25 | 100 | 0.25 | 80 | 2 |
| 9 | Acid | Nitric Acid | 16M | ECAT A | 20 | 200 | 0.10 | 60 | 1.5 |
| 10, RE-B | — | — | — | ECAT B | — | — | | — | — |
| 11 | Acid | Nitric Acid | 16M | ECAT B | 25 | 100 | 0.25 | 82 | 3.25 |
| 12, RE-C | — | — | — | ECAT C | — | — | | — | — |
| 13 | Acid | Nitric Acid | 16M | ECAT C | 2 | 200 | 0.01 | 117 (reflux) | 16 |
| 14 | Acid | Nitric Acid | 16M | ECAT C | 75 | 300 | 0.25 | 114 (reflux) | 16 |
| 15 | Acid | Nitric Acid | 2M | ECAT C | 25 | 75 | 0.33 | 100 (reflux) | <0.25 |
| 16 | Acid | Hydrochloric Acid | 10M | ECAT C | 75 | 300 | 0.25 | 29 | 1 |
| 17 | Acid | Nitric Acid | 16M | ECAT C | 75 | 300 | 0.25 | 120 (reflux) | 0.6 |
| 18 | Acid | Hydrochloric Acid | 10M | ECAT C | 75 | 300 | 0.25 | 115 (reflux) | 14 |
| 19 | Acid | Nitric Acid, Recycled | | ECAT C | 30 | 122 | 0.25 | 75 (reflux) | 0.2 |
| 20 | Acid | Hydrochloric Acid | 10M | ECAT C | 75 | 300 | 0.25 | 70 (reflux) | 0.1 |
| 21 | Acid | Example 20 Filtrate Recycled | | ECAT C | 50 | 200 | 0.25 | 76 (reflux) | 0.1 |
| 22 | Acid | Hydrochloric Acid | 10M | ECAT C | 75 | 300 | 0.25 | 29 | 1 |
| 23 | Acid | Hydrochloric Acid | 10M | ECAT C + La | | | | | |
| 24 | Acid | Heat Acid, Batch 3 | 16M | ECAT C | 25 | 75 | 0.33 | 100 | <0.25 |
| 25 | Acid | Heat Acid, 5 um filter, Batch 3 | 16M | ECAT C | 25 | 75 | 0.33 | 100 | <0.25 |
| 26 | Acid | Heat Powder, Batch 3 | 16M | ECAT C | 25 | 75 | 0.33 | 100 | <0.25 |
| 27 | Acid | Heat Acid + Heat Powder, Batch 1 | 16M | ECAT C | 25 | 75 | 0.33 | 100 | <0.25 |
| 28 | Acid | Heat Acid + Heat Powder, Batch 3 | 16M | ECAT C | 25 | 75 | 0.33 | 100 | <0.25 |
| 29, RE-D | — | — | — | Fresh Catalyst A | — | — | | — | — |
| 30 | Acid | Nitric Acid | 16M | Fresh Catalyst A | 25 | 100 | 0.25 | 78 | 0.6 |
| 31 | Acid | Nitric Acid | 16M | Fresh Catalyst A | 75 | 300 | 0.25 | 120 (reflux) | 0.6 |

TABLE 1B

| Example No | Acid/Base | Reagent/Conditions | Reagent Concentration | Al$_2$O$_3$ | SiO$_2$ | La$_2$O$_3$ | CeO$_2$ | Pr$_6$O$_{11}$ |
|---|---|---|---|---|---|---|---|---|
| 1, RE-A | — | — | — | 54.3% | 40.4% | 1.1% | 0.22% | 0.09% |
| 2 | Acid | Nitric Acid | 16M | 50.4% | 46.1% | 0.1% | 0.04% | 0.05% |
| 3 | Base | Ammonium Citrate | 1M | 52.7% | 42.7% | 0.7% | 0.15% | 0.05% |
| 4 | Acid | Nitric Acid | 16M | 52.8% | 43.0% | 0.3% | 0.10% | 0.00% |
| 5 | Acid | Nitric Acid | 16M | 51.7% | 44.5% | 0.3% | 0.06% | 0.04% |
| 6 | Acid | Sulfuric Acid | 96% | 53.2% | 42.5% | 0.6% | 0.10% | 0.06% |
| 7 | Acid | Hydrochloric Acid | 12M | 52.6% | 43.9% | 0.2% | 0.04% | 0.00% |
| 8 | Acid | Acetic Acid | 84% | 53.0% | 41.8% | 0.9% | 0.19% | 0.08% |
| 9 | Acid | Nitric Acid | 16M | 51.5% | 44.4% | 0.3% | 0.09% | 0.03% |
| 10, RE-B | — | — | — | 48.5% | 44.9% | 2.4% | 0.11% | 0.02% |
| 11 | Acid | Nitric Acid | 16M | 47.1% | 48.5% | 0.7% | 0.07% | 0.00% |
| 12, RE-C | — | — | — | 59.4% | 34.1% | 2.4% | 0.03% | 0.00% |
| 13 | Acid | Nitric Acid | 16M | 22.4% | 73.3% | 0.6% | 0.02% | 0.00% |
| 14 | Acid | Nitric Acid | 16M | 54.3% | 41.0% | 1.2% | 0.02% | 0.00% |
| 15 | Acid | Nitric Acid | 2M | 60.0% | 35.8% | 0.6% | 0.02% | 0.00% |
| 16 | Acid | Hydrochloric Acid | 10M | 59.8% | 35.1% | 1.2% | 0.02% | 0.00% |
| 17 | Acid | Nitric Acid | 16M | 57.1% | 38.4% | 0.8% | 0.02% | 0.00% |
| 18 | Acid | Hydrochloric Acid | 10M | 36.7% | 58.5% | 0.9% | 0.01% | 0.00% |
| 19 | Acid | Nitric Acid, Recycled | | 59.8% | 35.4% | 0.9% | 0.02% | 0.04% |
| 20 | Acid | Hydrochloric Acid | 10M | 59.5% | 36.3% | 0.6% | 0.02% | 0.00% |
| 21 | Acid | Example 20 Filtrate Recycled | | 60.0% | 35.1% | 1.0% | 0.02% | 0.00% |
| 22 | Acid | Hydrochloric Acid | 10M | 59.8% | 35.1% | 1.2% | 0.02% | 0.00% |
| 23 | Acid | Hydrochloric Acid | 10M | 55.3% | 38.7% | 2.4% | 0.00% | 0.00% |
| 24 | Acid | Heat Acid, Batch 3 | 16M | 59.9% | 34.7% | 1.5% | 0.03% | 0.00% |
| 25 | Acid | Heat Acid, 5 um filter, Batch 3 | 16M | 60.1% | 35.2% | 0.9% | 0.02% | 0.00% |
| 26 | Acid | Heat Powder, Batch 3 | 16M | 59.5% | 34.8% | 1.7% | 0.03% | 0.03% |
| 27 | Acid | Heat Acid + Heat Powder, Batch 1 | 16M | 60.0% | 35.0% | 1.2% | 0.02% | 0.00% |
| 28 | Acid | Heat Acid + Heat Powder, Batch 3 | 16M | 60.0% | 34.1% | 1.9% | 0.04% | 0.00% |
| 29, RE-D | — | — | — | 36.5% | 57.4% | 3.2% | 0.02% | 0.00% |
| 30 | Acid | Nitric Acid | 16M | 26.9% | 70.1% | 0.1% | 0.00% | 0.00% |
| 31 | Acid | Nitric Acid | 16M | 25.2% | 71.6% | 0.4% | 0.00% | 0.00% |

| Example No | Nd$_2$O$_3$ | Na$_2$O | MgO | Fe$_2$O$_3$ | V$_2$O$_5$ | NiO | PbO |
|---|---|---|---|---|---|---|---|
| 1, RE-A | 0.12% | 0.56% | 0.00% | 0.77% | 0.18% | 0.27% | 0.01% |
| 2 | 0.01% | 0.31% | 0.00% | 0.78% | 0.14% | 0.32% | 0.00% |
| 3 | 0.07% | 0.42% | 0.00% | 0.83% | 0.12% | 0.31% | 0.00% |
| 4 | 0.02% | 0.43% | 0.00% | 0.86% | 0.14% | 0.33% | 0.01% |
| 5 | 0.02% | 0.42% | 0.00% | 0.88% | 0.14% | 0.33% | 0.01% |
| 6 | 0.06% | 0.40% | 0.00% | 0.85% | 0.13% | 0.32% | 0.01% |
| 7 | 0.02% | 0.39% | 0.00% | 0.80% | 0.13% | 0.31% | 0.00% |
| 8 | 0.11% | 0.49% | 0.00% | 0.88% | 0.19% | 0.33% | 0.01% |
| 9 | 0.03% | 0.45% | 0.00% | 0.89% | 0.14% | 0.33% | 0.01% |
| 10, RE-B | 0.01% | 0.40% | 0.14% | 0.92% | 0.39% | 0.23% | 0.05% |
| 11 | 0.00% | 0.21% | 0.05% | 0.87% | 0.30% | 0.24% | 0.03% |
| 12, RE-C | 0.05% | 0.49% | 0.00% | 0.86% | 0.79% | 0.40% | 0.02% |
| 13 | 0.00% | 0.12% | 0.00% | 0.58% | 0.30% | 0.34% | 0.00% |
| 14 | 0.00% | 0.22% | 0.00% | 0.69% | 0.60% | 0.35% | 0.01% |
| 15 | 0.00% | 0.31% | 0.00% | 0.82% | 0.63% | 0.42% | 0.02% |
| 16 | 0.03% | 0.40% | 0.00% | 0.90% | 0.67% | 0.41% | 0.02% |
| 17 | 0.00% | 0.19% | 0.00% | 0.80% | 0.73% | 0.44% | 0.02% |
| 18 | 0.00% | 0.18% | 0.00% | 0.79% | 0.46% | 0.40% | 0.01% |
| 19 | 0.00% | 0.39% | 0.00% | 0.88% | 0.68% | 0.42% | 0.02% |
| 20 | 0.00% | 0.34% | 0.00% | 0.79% | 0.63% | 0.42% | 0.02% |
| 21 | 0.02% | 0.39% | 0.00% | 0.85% | 0.65% | 0.42% | 0.02% |
| 22 | 0.03% | 0.40% | 0.00% | 0.90% | 0.67% | 0.41% | 0.02% |
| 23 | 0.02% | 0.18% | 0.00% | 0.74% | 0.70% | 0.39% | 0.01% |
| 24 | 0.00% | 0.40% | 0.00% | 0.86% | 0.71% | 0.42% | 0.02% |
| 25 | 0.00% | 0.39% | 0.00% | 0.85% | 0.69% | 0.41% | 0.01% |
| 26 | 0.03% | 0.41% | 0.00% | 0.86% | 0.69% | 0.40% | 0.02% |
| 27 | 0.02% | 0.32% | 0.00% | 0.83% | 0.69% | 0.40% | 0.02% |
| 28 | 0.03% | 0.45% | 0.00% | 0.84% | 0.72% | 0.40% | 0.02% |
| 29, RE-D | 0.00% | 0.21% | 0.00% | 0.63% | 0.01% | 0.01% | 0.01% |
| 30 | 0.00% | 0.00% | 0.00% | 0.52% | 0.02% | 0.03% | 0.00% |
| 31 | 0.00% | 0.00% | 0.00% | 0.46% | 0.00% | 0.02% | 0.00% |

TABLE 1C

| Example No | Acid/Base | Reagent/Conditions | Reagent Concentration | Catalyst | % RE$_2$O$_3$ (R) | % RE$_2$O$_3$ Removal | % Al$_2$O$_3$ Removal (A) | % Al$_2$O$_3$ Removed/ % RE$_2$O$_3$ Removed (x) |
|---|---|---|---|---|---|---|---|---|
| 1, RE-A | — | — | — | ECAT A | 1.48% | 0% | 0% | |
| 2 | Acid | Nitric Acid | 16M | ECAT A | 0.25% | 83% | 7% | 0.1 |
| 3 | Base | Ammonium Citrate | 1M | ECAT A | 0.91% | 38% | 3% | 0.1 |
| 4 | Acid | Nitric Acid | 16M | ECAT A | 0.45% | 70% | 3% | 0.0 |
| 5 | Acid | Nitric Acid | 16M | ECAT A | 0.37% | 75% | 5% | 0.1 |
| 6 | Acid | Sulfuric Acid | 96% | ECAT A | 0.80% | 46% | 2% | 0.0 |
| 7 | Acid | Hydrochloric Acid | 12M | ECAT A | 0.30% | 80% | 3% | 0.0 |
| 8 | Acid | Acetic Acid | 84% | ECAT A | 1.32% | 11% | 2% | 0.2 |
| 9 | Acid | Nitric Acid | 16M | ECAT A | 0.41% | 73% | 5% | 0.1 |
| 10, RE-B | — | — | — | ECAT B | 2.58% | 0% | 0% | |
| 11 | Acid | Nitric Acid | 16M | ECAT B | 0.78% | 70% | 3% | 0.0 |
| 12, RE-C | — | — | — | ECAT C | 2.53% | 0% | 0% | |
| 13 | Acid | Nitric Acid | 16M | ECAT C | 0.59% | 77% | 62% | 0.8 |
| 14 | Acid | Nitric Acid | 16M | ECAT C | 1.27% | 50% | 9% | 0.2 |
| 15 | Acid | Nitric Acid | 2M | ECAT C | 0.58% | 77% | −1% | 0.0 |
| 16 | Acid | Hydrochloric Acid | 10M | ECAT C | 1.23% | 51% | −1% | 0.0 |
| 17 | Acid | Nitric Acid | 16M | ECAT C | 0.84% | 67% | 4% | 0.1 |
| 18 | Acid | Hydrochloric Acid | 10M | ECAT C | 0.94% | 63% | 38% | 0.6 |
| 19 | Acid | Nitric Acid, Recycled | | ECAT C | 0.92% | 64% | −1% | 0.0 |
| 20 | Acid | Hydrochloric Acid | 10M | ECAT C | 0.65% | 74% | 0% | 0.0 |
| 21 | Acid | Example 20 Filtrate Recycled | | ECAT C | 1.04% | 59% | −1% | 0.0 |
| 22 | Acid | Hydrochloric Acid | 10M | ECAT C | 1.23% | 51% | −1% | 0.0 |
| 23 | Acid | Hydrochloric Acid | 10M | ECAT C + La | 2.41% | 5% | 7% | 1.5 |
| 24 | Acid | Heat Acid, Batch 3 | 16M | ECAT C | 1.52% | 40% | −1% | 0.0 |
| 25 | Acid | Heat Acid, Sum filter, Batch 3 | 16M | ECAT C | 0.88% | 65% | −1% | 0.0 |
| 26 | Acid | Heat Powder, Batch 3 | 16M | ECAT C | 1.76% | 30% | 0% | 0.0 |
| 27 | Acid | Heat Acid + Heat Powder, Batch 1 | 16M | ECAT C | 1.27% | 50% | −1% | 0.0 |
| 28 | Acid | Heat Acid + Heat Powder, Batch 3 | 16M | ECAT C | 1.98% | 22% | −1% | 0.0 |
| 29, RE-D | — | — | — | Fresh Catalyst A | 3.26% | 0% | 0% | |
| 30 | Acid | Nitric Acid | 16M | Fresh Catalyst A | 0.11% | 97% | 26% | 0.3 |
| 31 | Acid | Nitric Acid | 16M | Fresh Catalyst A | 0.40% | 88% | 31% | 0.4 |

Tables 1A-1C, above, show the results of a number of different experiments using various embodiments of the process outlined above. Tables 1A-1C show the results of performing the process upon four different RE-containing materials, designated as RE-A; RE-B; RE-C and RE-D. In three of the four cases provided for in Tables 1A-1C, the RE-containing material was a spent FCC catalyst (an ECAT, designated as ECAT A, ECAT B, and ECAT C) and in the fourth case, it was a fresh FCC catalyst (designated as "Fresh Catalyst A"). Tables 1A-1C all relate to the same experiments (thus, Example Nos. 1-31 of Table 1A reference the same experiments as Example Nos. 1-31 of Tables 1B and 1C), but with each table focusing on different types of data.

Briefly, the first few columns of each of Tables 1A-1C are the same to facilitate understanding of the data of each of the tables. More specifically, the first column of each table shows the Example Number (from 1-31), where Example Nos. 1-9 utilized RE-A (which is ECAT-A, as seen from the fifth column), Examples 10 and 11 utilized RE-B (which is ECAT-B, as seen from the fifth column), Example Nos. 12-28 utilized RE-C (which is ECAT-C, as seen from the fifth column), and Example Nos. 29-31 utilized RE-D (which is Fresh Catalyst A, as seen from the fifth column). The second column of Tables 1A-1C shows whether the extracting agent (reagent) is an acid or a base, and the third column shows the specific acid or base, along with any special conditions, such as Example No. 19 using recycled nitric acid, Example No. 21 using the filtrate recycled from Example No. 19, etc., as additionally described below. The fourth column of each of Tables 1A-1C shows the molar concentration of the reagent (extracting agent) used.

Example Nos. 1, 10, 12 and 29 merely show the original conditions of each of the four catalyst samples, and thus some of the columns of Tables 1A-1C (such as the Acid/Base designation, the Reagent/Conditions description, the Reagent Concentration, etc.) are not applicable because the catalyst has not been acted upon, and thus these columns are left blank (or designated by a dash "-").

Columns 6-10 of Table 1A show various details each experiment, such as the quantity of catalyst utilized, in grams ("Catalyst Qty, gr"); the quantity of reagent (extracting agent) utilized, in milliliters ("Reagent Qty, ml"); the result of the ratio of the quantity of catalyst utilized, in grams to the quantity of reagent (extracting agent) utilized, in milliliters ("gr Cat/ml Reagent"), i.e., the ratio of column 6 over column 7; the maximum temperature that the combination of the catalyst and the reagent (extracting agent) was heated to, in degrees Celsius ("Tmax (C)"); and the amount of time that the catalyst was in contact with the reagent (extracting agent), in hours ("Time (hrs)").

Preferably, at least at least 10 grams of the rare earth containing material (column 6 of Table 1A) are provided for each 100 milliliters of the extracting agent (column 7 of Table 1A). Even more preferably, at least 20 grams of the rare earth containing material are provided for each 100 milliliters of the extracting agent.

Chemical analysis was performed on samples using wavelength dispersive x-ray fluorescence (Bruker SRS3000) using samples prepared by first heating the sample to 732-1000 C, followed by preparing glass beads by fusion. The results of such chemical analysis are shown in Table 1B, for each of the following materials: Al$_2$O$_3$, SiO$_2$, La$_2$O$_3$, CeO$_2$, Pr$_2$O$_3$, Nd$_2$O$_3$, Na$_2$O, Fe$_2$O$_3$, V$_2$O$_5$, NiO and PbO.

A representative example of the conditions utilized in the current process is as follows, with details from Table 1A: The amount (in grams) of the catalyst listed in the "Catalyst Qty"

column of the catalyst specified in the "Catalyst" column was added to the amount (in ml) of reagent specified under the "Reagent Qty" column of the particular reagent listed in the "Reagent/Conditions" column, where the reagent had the concentration listed in the "Reagent Concentration." The mixture was heated to approximately to the temperature (C) listed in the "Tmax" column, for approximately the time (in hours) listed in the "Time" column. Afterwards, the solid and liquid were separated using a porous ceramic filter (such as a filter with a pore size of between 160-250 micron) under either vacuum filtration conditions or settling. The resulting filtrate was then further separated by settling or finer pore size ceramic filter (such as 5-6 micron pore size). Select samples of filtrate were analyzed by x-ray fluorescence and found to typically contain the following elements Al, P, K, Ca, Ti, V, Fe, Ni, Cu, Sr, Ba, La, Ce, Pr, Nd. Quantitative analysis on the solid was analyzed by x-ray fluorescence, and the results are reported in Table 1B for representative samples prepared in Table 1A. Table 1C shows ratios of rare earth (RE) oxides, $RE_2O_3$ (which is the sum of the rare earth oxides based on adding La, Ce, Pr, and Nd from Table 1B), and the improvements compared with the base case of each example set the Lanthanum oxide, $La_2O_3$, Aluminum oxide, $Al_2O_3$. Table 1C also shows the percent $Al_2O_3$ removed divided by the percent $RE_2O_3$ removed. Additionally, the percent $Al_2O_3$ removed divided by the percent $La_2O_3$ removed is also shown in Table 1C.

Additional details regarding the examples of Tables 1A-1C follow:

Examples 2-9 show the effect of varying the reagent, reagent amount, reagent concentration, mixture temperature, time, and rare earth containing material quantity using a refinery FCC equilibrium catalyst (ECAT) sample (designated as ECAT-A), the details of which are shown in Example 1.

Example 11 shows a similar comparison of a second ECAT sample (designated as ECAT-B), with the details of this second ECAT sample being is shown as Example 10. As can be seen in Table 1B, ECAT-B includes both Mg and Ce, which are indicators of sorbent material, such as that used for reducing sulfur oxides from the flue gases of an FCC process. As indicated by comparing Example 11 with the data of untreated Example 10, the reduction in the amount of Ce shows that the current process is capable of removing RE materials from a sorbent-containing material.

Examples 13-18 show a similar comparison to a third ECAT sample (designated as ECAT-C), with the details of this third ECAT sample being shown as Example 12.

Example 19 shows results from a rare earth containing ECAT sample that was subject to reaction with a 16 molar solution of nitric acid. Following the reaction, the powder and liquid were separated by filtration. The filtrate was then reacted with a fresh sample of rare earth containing ECAT and the process repeated for a total of 5 cycles. The data in Tables 1A-C is of the rare earth containing sample following the 5 cycles.

Similarly, Example 21 in Tables 1A-C show the results obtained after the second cycle using hydrochloric acid. The first cycle data is shown in Example 20.

Example 23 shows the effect of adding rare earth compounds back to the sample of Example 22. This experiment was performed by impregnating a dilute lanthanum nitrate solution onto the sample of Example 22 in which the majority of the rare earth had been removed by the extraction process of the present invention. Table 1B shows that the $La_2O_3$ content of Example 23 is about the same as that of the initial starting material (Example 12).

For all examples in Examples 1-23 in which the optional heating step of FIG. 1 is utilized, the heat was applied via Step S2* (i.e., after the RE containing material had been combined with the extracting agent). Examples 24-28 show the effect of applying heat of FIG. 1, during Step S1A* (to the RE containing material) in Example 26, during Step S1B* (to the extracting agent) in Example 24 and during a combination of both Step S1A* and Step S1B* for Examples 27-28. The reuse feature of the La-containing solution, path 80 in FIG. 1, is also shown in that the data in Examples 24, 25, 26 and 28, which were all taken following three cycles. Example 27 shows the results of Example 28 following just a single cycle.

Examples 30 and 31 show results of the inventive process on a fresh FCC catalyst shown in Example 29. Under similar conditions to those performed on ECAT A, ECAT B and ECAT C, the rare earth content was reduced, but a significantly higher $Al_2O_3$ loss was observed.

As can be seen from a review of Tables 1A-1C, embodiments of the present processes are capable of extracting a relatively large proportion of the rare earth element, or elements (as the oxide equivalent(s)) from the RE containing material, while extracting only a relatively moderate proportion of the aluminum. Such a result has many benefits, one of which is that with little or no aluminum removal, the support structure of the catalyst remains strong, in embodiments such as those with a zeolite structure. Additionally, with the aluminum remaining in the RE containing material, as opposed to being a separate solid in the liquid solution, filtration to separate the solids from the liquids, if used, can be accomplished much easier.

As a way of quantify some of these findings, which show a relatively high amount of rare earth extraction, but with a relatively low amount aluminum extraction, Applicant has determined that when the following relationships are satisfied, the process is being run as intended:

(i) $R_F\%$ is less than or equal to approximately 0.4 $R_O\%$; and (ii) $A_F\%$ is greater than or equal to approximately 0.5 $A_O\%$, where:

$A_O\%$ is the original weight percentage of aluminum, as its oxide equivalent, of the RE containing material before undergoing the process;

$R_O\%$ is the original weight percentage of the at least one rare earth element, as its oxide equivalent of the RE containing material before undergoing the process;

$R_F\%$ is the final, resulting weight percentage of the at least one rare earth element, as its oxide equivalent, remaining in the RE containing material; and $A_F\%$ is the final, resulting weight percentage of aluminum, as its oxide equivalent, remaining in the RE containing material.

In certain embodiments, improved results can be realized if the following relationships are satisfied:

(ia) $R_F\%$ is less than or equal to approximately 0.3 $R_O\%$; and (iia) $A_F\%$ is greater than or equal to approximately 0.7 $A_O\%$.

Finally, even further improved results can be achieved if the following relationships are satisfied:

(ib) $R_F\%$ is less than or equal to approximately 0.3 $R_O\%$; and (iib) $A_F\%$ is greater than or equal to approximately 0.9 $A_O\%$.

Another way to quantify some of these findings uses the following variables:

$W_{RE}$=the weight the rare earth containing material, in grams (such as in column 6 of Table 1A);

$A_O$%=the original weight percentage of the aluminum in the rare earth containing material, represented as its weight percent oxide equivalent $Al_2O_3$ (such as in column 5 of Table 1B for Examples 1, 10, 12 and 29);

$R_O$%=the original weight percentage of the at least one rare earth element, represented as its weight percent oxide equivalent (such as in any of columns 7, 8, 9 or 10 of Table 1B for Examples 1, 10, 12 and 29);

$V_S$=the volume of the solution that the rare earth containing material is reacted with (such as in column 7 of Table 1A);

$R_F$%=the resulting weight percentage of the at least one rare earth element, as its oxide equivalent, remaining in the rare earth containing material, after being reacted with the solution (such as in any of columns 7, 8, 9 or 10 of Table 1B for any of the examples other than Examples 1, 10, 12 and 29 (which relate to the un-reacted catalyst)); and $A_F$%=the resulting weight percentage of aluminum, as its oxide equivalent, remaining in the rare earth containing material, after being reacted with the solution (such as in column 5 of Table 1B for any of the examples other than Examples 1, 10, 12 and 29 (which relate to the un-reacted catalyst));

Where the following relationships are satisfied:

$$x = \frac{R_o}{A_o} \times \frac{A_f - A_o}{R_f - R_o}$$

where x is less than or equal to about 0.8; and $y = W_{RE}$ (in grams)/$V_S$ (in milliliters), where y is greater than or equal to about 0.025.

In certain embodiments, improved results can be realized when y is greater than or equal to about 0.03, and even further improved results can be realized when y is greater than or equal to about 0.025.

As mentioned earlier, in certain embodiments, the resulting solids that have undergone the process of FIGS. 1 and 2 could actually perform their designated catalytic functions better than even the original, fresh catalyst, either with or without adding the rare earth materials to the molecular sieve. For example, the following chart of Table 2 shows the results of catalytic testing over a typical FCC feed on ECAT samples with no treatment (Example 12), and with treatment using nitric acid (Example 17) or hydrochloric acid (Example 22) as the extractant, where Examples 12, 17 and 22 are the same examples of Tables 1A-1C. The extraction process of the present invention improved performance variables, such as conversion, LPG, Gasoline and LCO for the 7.0 catalyst/oil ratio data shown. In one example (Example 23), the initial rare earth concentration was added back to the extracted ECAT sample and the sample was again analyzed for catalytic performance. Improvements in performance remained even after re-applying the rare earth compound back to the catalyst (in this case Lanthanum nitrate).

TABLE 2

| Example No. | 12, RE-C | 17 | 22 | 23 |
|---|---|---|---|---|
| Conversion, w % | 73.2 | 77.7 | 73.8 | 75.8 |
| Coke | 9.7 | 11.0 | 9.6 | 9.1 |
| C2- | 2.78 | 3.18 | 2.81 | 2.76 |
| Total C3s | 5.6 | 7.2 | 6.2 | 6.8 |
| Total C4s | 9.9 | 12.3 | 10.9 | 11.8 |
| LPG | 15.5 | 19.6 | 17.1 | 18.5 |
| Total Gasoline (C5-430 F.) | 45.2 | 44.0 | 44.3 | 45.4 |
| LCO (430-650 F.) | 15.7 | 13.3 | 14.8 | 14.1 |
| Bottoms (650 F.+) | 11.1 | 9.0 | 11.4 | 10.1 |

Catalytic testing was performed on an ACE Model R+ (Kayser Technology Inc.) laboratory fluidized bed cracking unit at a catalyst/oil ratio of 7.0. The feed properties were API: 20.84; Concarbon: 1.23%, Sulfur: 1.52%, IBP: 599F, FBP: 1124F. Liquid and gaseous products were analyzed using GC methods.

TABLE 3

| Example No | Reagent | Particle Size, <20 um | % Zeolite Change | Surface Area m2/g |
|---|---|---|---|---|
| 1, RE-A | — | 0 | 0% | 123 |
| 2 | Nitric Acid | 1 | 32% | 163 |
| 3 | Ammonium Citrate | 6 | 7% | 135 |
| 4 | Nitric Acid | 3 | 26% | 125 |
| 5 | Nitric Acid | 0 | 38% | 115 |
| 6 | Sulfuric Acid | 9 | -32% | 58 |
| 7 | Hydrochloric Acid | 0 | 36% | 136 |
| 8 | Acetic Acid | 7 | -8% | 127 |
| 9 | Nitric Acid | 4 | 22% | 128 |
| 10, RE-B | — | 2 | 0% | |
| 11 | Nitric Acid | 5 | | 136 |
| 12, RE-C | — | 6 | 0% | 101 |
| 13 | Nitric Acid | 31 | 146% | — |
| 14 | Nitric Acid | 31 | 67% | 150 |
| 16 | Hydrochloric Acid | 5 | 77% | — |
| 17 | Nitric Acid | 6 | 94% | — |
| 18 | Hydrochloric Acid | 55 | 26% | — |
| 22 | Hydrochloric Acid | 5 | 77% | — |
| 23 | Hydrochloric Acid | | 70% | — |
| 29, RE-D | — | 11 | 0% | 293 |
| 30 | Nitric Acid | 2 | -100% | 247 |
| 31 | Nitric Acid | 5 | -100% | — |

Table 3, above, shows the particle size fraction less than 20 microns obtained via laser light scattering techniques (Beckman Coulter LS130). Generally, samples which have a high loss in alumina during the processing also have an increased amount of <20 micron fraction of the resulting material.

Applicant has also discovered that the amount of zeolite contained in zeolite-containing rare earth containing materials increases by contact with the reagents of the present invention. Table 3 shows the percent zeolite change, which was measured via x-ray diffraction. The data was obtained by measuring the intensity of zeolite contained in both the initial rare earth containing material as well as the rare earth extracted sample following calcination of both to 538-732 C. A positive number for zeolite change represents an increase in zeolite content, while a negative represents a decrease. The surface area, as measured by a multi-point BET method (Quantachrome NOVA 3000) on select samples, is generally supportive of the zeolite content changes, but is not as precise due to it being an indirect measurement of zeolite content when compared with x-ray diffraction.

Thus, as various different embodiments of the present invention have been described, it should be clear that various methods are provided for extracting rare earth materials from a rare earth containing material by using an extracting agent to extract a relatively large proportion of the rare earth element(s) from the rare earth containing material. In preferred embodiments, the rare earth containing material also contains aluminum, and only a relatively moderate proportion of the aluminum is extracted. The valuable rare earth materials can be extracted from, for example, spent catalyst, prior to disposing of the spent catalyst, which results in both environmental and economic benefits. In other embodiments, the spent catalyst that has undergone the present process can be re-used as a catalyst, either with or without additional materials being added thereto. Such re-use of the catalyst provides environmental benefits by eliminating the amount of catalyst that ends up in landfills.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method of producing a resulting solution including at least one rare earth element, the method comprising the steps of:
   providing a first sample of a rare earth containing material having the at least one rare earth element therein;
   reacting the first sample of the rare earth containing material with an extracting agent to extract at least a portion of the at least one rare earth element from the first sample of the rare earth containing material;
   separating the reacted first sample, from which has been extracted at least some of the at least one rare earth element previously associated therewith, from the extracting agent;
   repeating the reacting step for multiple iterations, designated as (n) iterations where (n) is a whole number, with an extracting agent that includes at least some of the rare earth element, but with a sample of a rare earth containing material that differs from the first sample of the rare earth containing material, for at least some of said multiple iterations of said reacting step, to further enrich the amount of the at least one rare earth element in the resulting solution;
   repeating the separating step for (n) iterations; and
   obtaining the resulting solution, which includes the at least one rare earth element extracted from the rare earth containing material during the multiple iterations of said reacting step.

2. The method according to claim 1, wherein at least some of the samples of rare earth containing material used during the multiple iterations of the reacting step include the same rare earth element as the first sample of the rare earth containing material.

3. The method according to claim 1, wherein the extracting agent used in at least one of the multiple iterations of said reacting step is the extracting agent previously used in an earlier iteration of the reacting step.

4. The method according to claim 1, wherein:
   the extracting agent is a liquid solution having a pH of either less than approximately 6 or greater than approximately 8; and
   the rare earth containing material is a molecular sieve containing material.

5. The method according to claim 1, wherein:
   the extracting agent is a liquid solution having a pH of either less than approximately 3 or greater than approximately 10; and
   the rare earth containing material is a molecular sieve containing material.

6. The method according to claim 4, wherein during each successive iteration of the reacting step, the amount of the rare earth element in the extracting agent used during a particular iteration of the reacting step is greater than or approximately equal to the amount of rare earth element in the extracting agent of the immediately preceding iteration of the reacting step.

7. The method according to claim 1, wherein:
   the at least one rare earth element comprises lanthanum (La);
   the extracting agent includes nitric acid ($NO_3$); and
   the resulting solution includes La $(NO_3)_3$ and ($H_2O$).

8. The method according to claim 1, wherein:
   the at least one rare earth element comprises lanthanum (La);
   the extracting agent includes hydrochloric acid (HCl).

9. The method according to claim 1, wherein the extracting agent is a basic solution.

10. The method according to claim 1, wherein the extracting agent is an acidic solution.

11. The method according to claim 4, wherein at least 10 grams of the rare earth containing material are provided for each 100 milliliters of the extracting agent.

12. The method according to claim 4, wherein the molecular sieve containing material is a fluid catalytic cracking (FCC) catalyst.

13. The method according to claim 1, wherein (n) is greater than or equal to 200.

14. The method according to claim 1, wherein said resulting solution, after performing said reacting step multiple times, includes at least 20%, on an oxide basis, of the at least one rare earth element that was extracted from the rare earth containing material.

15. The method according to claim 4, further comprising the step of rinsing the reacted molecular sieve containing material with a rinsing liquid between at least some of the iterations of said reacting step.

16. The method according to claim 4, further comprising the application of heat during at least some of said iterations of said reacting step.

17. A method of recovering one or more rare earth elements from a rare earth containing material, wherein said method comprises the steps of:
   providing the rare earth containing material having aluminum and at least one rare earth element therein, wherein the weight percentage of the aluminum, as its oxide equivalent, is defined as $A_O\%$ and the weight percentage of the at least one rare earth element, as its oxide equivalent, is defined as $R_O\%$; and
   reacting the rare earth containing material with a solution to extract a relatively large proportion of at least a portion of the at least one rare earth element from the rare earth containing material, while extracting only a relatively moderate proportion of the aluminum, such that the resulting weight percentage of the at least one rare earth element, as its oxide equivalent, remaining in the rare earth containing material, defined as $R_F\%$, and the resulting weight percentage of aluminum, as its oxide equivalent, remaining in the rare earth containing material, defined as $A_F\%$, satisfy the following relationships:
   $R_F\%$ is less than or equal to approximately 0.4 $R_O\%$; and
   $A_F\%$ is greater than or equal to approximately 0.5 $A_O\%$.

18. The method according to claim 17, wherein the following relationships are satisfied:
   $R_F\%$ is less than or equal to approximately 0.3 $R_O\%$; and
   $A_F\%$ is greater than or equal to approximately 0.7 $A_O\%$.

19. The method according to claim 17, wherein the following relationships are satisfied:
   $R_F\%$ is less than or equal to approximately 0.3 $R_O\%$; and
   $A_F\%$ is greater than or equal to approximately 0.9 $A_O\%$.

20. The method according to claim 17, wherein:
   the solution is a liquid solution having a pH of either less than approximately 6 or greater than approximately 8; and the rare earth containing material is a molecular sieve containing material.

21. The method according to claim 20, wherein the molecular sieve containing material is a zeolite containing material.

22. The method according to claim 17, wherein the at least one rare earth element comprises lanthanum and/or a compound including lanthanum.

23. The method according to claim 17, wherein the at least one rare earth element is selected from the group consisting of cerium, praseodymium, neodymium, and alloys thereof.

24. A method of recovering one or more rare earth elements from a rare earth containing material, wherein said method comprises the steps of:
providing the rare earth containing material, of a weight $W_{RE}$, having aluminum and at least one rare earth element therein, wherein the weight percentage of the aluminum, represented as its weight percent oxide equivalent $Al_2O_3$, is defined as $A_O\%$ and the weight percentage of the at least one rare earth element, represented as its weight percent oxide equivalent, is defined as $R_O\%$; and
reacting the rare earth containing material with a solution, of a volume $V_S$, to extract a majority of the at least one rare earth element from the rare earth containing material, while extracting no more than half of the aluminum, such that the resulting weight percentage of the at least one rare earth element, as its oxide equivalent, remaining in the rare earth containing material, defined as $R_f\%$, and the resulting weight percentage of aluminum, as its oxide equivalent, remaining in the rare earth containing material, defined as $A_f\%$, satisfy the following relationships:

$$x = \frac{R_o}{A_o} \times \frac{A_f - A_o}{R_f - R_o}$$

where x is less than or equal to about 0.8; and
$y = W_{RE}$ (in grams)/$V_S$ (in milliliters),
where y is greater than or equal to about 0.025.

25. The method according to claim 24, further comprising a step of heating the solution, which is in the form of a slurry, during the reacting step.

26. The method according to claim 25, wherein the heating step results in increasing the temperature of the solution to a maximum temperature within the range of at least approximately 45° C. and approximately 130° C.

27. The method according to claim 24, further comprising a step of heating at least one of the rare earth containing material and/or the solution prior to the reacting step.

28. The method according to claim 24, wherein the rare earth containing material is a zeolite containing material.

29. The method according to claim 24, wherein the rare earth containing material is a spent FCC catalyst.

30. The method according to claim 24, wherein the rare earth containing material is a sorbent containing material.

31. The method according to claim 1, wherein the extracting agent is a solution selected from the group consisting of ammonium citrate, ammonium hydroxide, ammonium chloride, and ammonium sulfate.

32. The method according to claim 1, wherein the extracting agent includes an acid selected from the group consisting of: maleic acid, formic acid, sulfuric acid, hydrochloric acid, and acetic acid.

33. The method according to claim 1, wherein the extracting agent is a solution that includes nitric acid.

34. The method according to claim 4, wherein the molecular sieve containing material is a zeolite containing material, and further wherein the zeolite containing material includes at least one element selected from the following: silicon, phosphorus and aluminum.

35. The method according to claim 4, wherein the molecular sieve containing material is a fluid catalytic cracking (FCC) catalyst, and further wherein the FCC catalyst is a spent FCC catalyst.

36. The method according to claim 1, wherein (n) is greater than or equal to 2.

37. The method according to claim 17, wherein the rare earth containing material is a fluid catalytic cracking (FCC) catalyst, and further wherein the FCC catalyst is a spent FCC catalyst.

38. The method according to claim 24, wherein:
the solution is a liquid solution having a pH of either less than approximately 6 or greater than approximately 8;
the rare earth containing material is a molecular sieve containing material,
wherein the molecular sieve containing material is a zeolite containing material, and further wherein the zeolite includes at least one element selected from the group consisting of: silicon, phosphorus and aluminum.

39. The method according to claim 24, wherein the at least one rare earth element comprises lanthanum and/or a compound including lanthanum.

40. The method according to claim 24, wherein the at least one rare earth element is selected from the group consisting of:
cerium, praseodymium, neodymium, and alloys thereof.

41. The method according to claim 1, wherein the rare earth containing material is a sorbent containing material.

42. The method according to claim 17, wherein the rare earth containing material is a sorbent containing material.

* * * * *